Aug. 8, 1950  E. A. SCHONROCK  2,517,933
CABLE DUMP TRAILER
Filed April 29, 1949  2 Sheets-Sheet 1
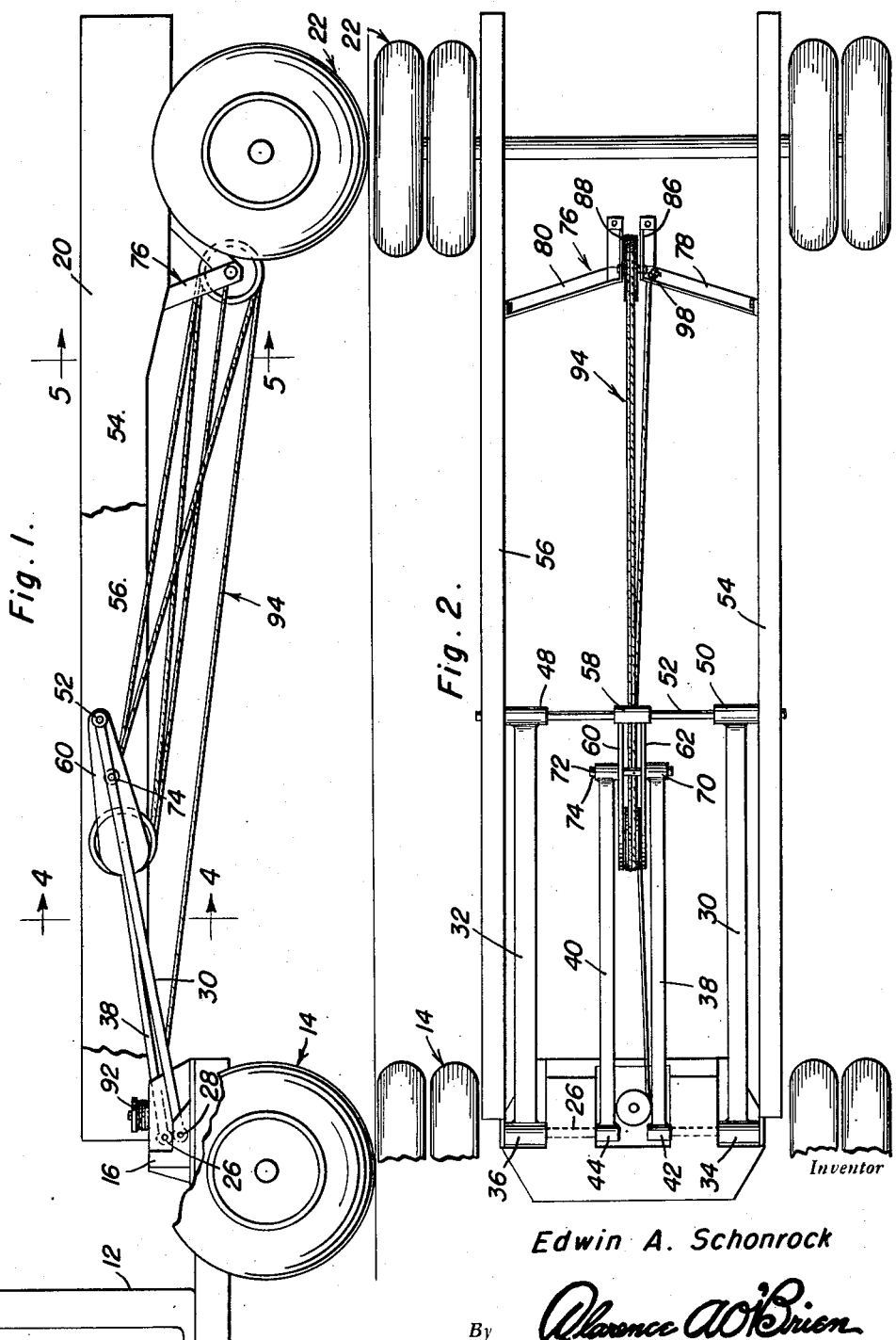
Inventor
Edwin A. Schonrock
By Clarence A. O'Brien
and Harvey B. Jacobson
Attorneys Aug. 8, 1950      E. A. SCHONROCK      2,517,933
CABLE DUMP TRAILER
Filed April 29, 1949      2 Sheets-Sheet 2
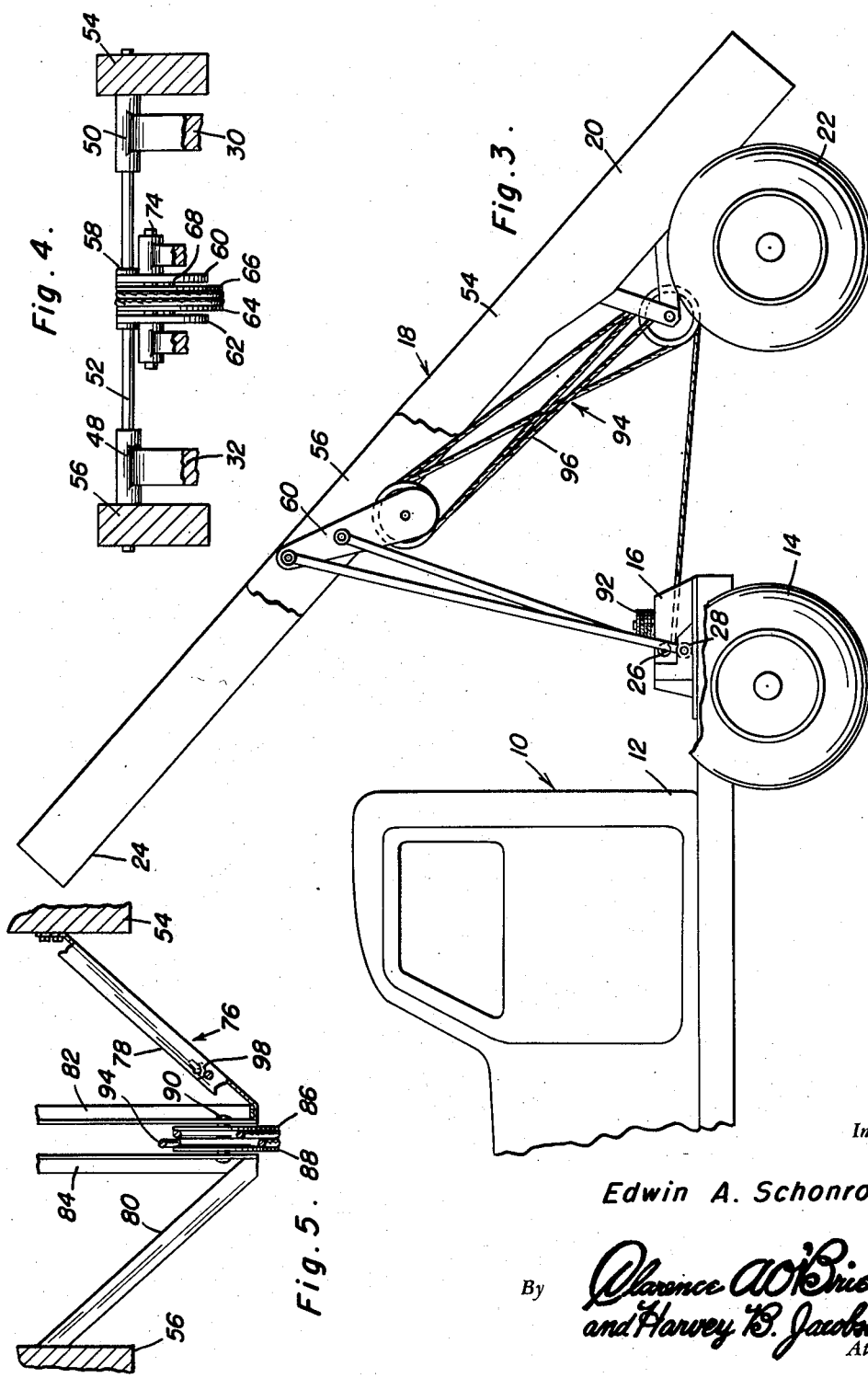
Inventor
Edwin A. Schonrock
By *Clarence A. O'Brien and Harvey B. Jacobson*
Attorneys Patented Aug. 8, 1950

2,517,933

UNITED STATES PATENT OFFICE 2,517,933

CABLE DUMP TRAILER

Edwin A. Schonrock, San Angelo, Tex.

Application April 29, 1949, Serial No. 90,476

4 Claims. (Cl. 298—19)

This invention relates to an improved dump truck construction and more particularly to a novel means for mounting and dumping the carrying body of a semi-trailer.

The primary object of this invention is to construct a semi-trailer or carrying body and to mount the forward end of the body on the fifth wheel or rear portion of the tractor vehicle and to elevate the semi-trailer to a dumping position by a simplified and inexpensive lifting mechanism, which includes means for moving the wheel assembly at the rear portion of the semi-trailer relative to the wheel assembly of the tractor vehicle, upon which the front or forward end of the semi-trailer or carrying body is detachably seated and supported, and mechanical means, responsive to the approaching movement of the wheel assemblies, for swinging the semi-trailer or carrying body upwardly. Structurally speaking, the semi-trailer is swung upwardly to a dumping position by a vertically disposed drum winch, associated with the fifth wheel of the tractor vehicle, and a block and tackle unit connected between the winch and semi-trailer, the latter actuating a compound toggle linkage mechanism associated with the semi-trailer or carrying body.

These and ancillary objects, such as the provision of a simplified, inexpensive and durable lift mechanism, are attained by this invention, a preferred embodiment of which is set forth in the following description and illustrated in the accompanying drawings, wherein:

Figure 1 is a side elevational view partly in section of the dump truck in carrying position;

Figure 2 is a top plan view of the lifting mechanism associated with the tractor vehicle semi-trailer for elevating the trailer into a dumping position;

Figure 3 is a side elevational view, with a portion of the semi-trailer broken away, of the dump truck in discharging position;

Figure 4 is an enlarged transverse detailed sectional view taken on line 4—4 of Figure 1, and, Figure 5 is an enlarged detailed sectional view taken on a transverse plane of line 5—5 of Figure 1 looking in the direction of the arrows.

Referring now to the drawings, the dump truck generally designated by the character reference 10 includes a conventional traction vehicle 12 having a rear wheel assembly 14 upon which is mounted a fifth wheel assembly 16. A semi-trailer or carrying body 18 is adapted for carrying or drafting placement on the tractor vehicle, the semi-trailer including a rigid frame 20, which is supported at its rear end by a conventional wheel assembly 22. The front or forward end 24 of the semi-trailer is normally supported on the fifth wheel 16, so that the semi-trailer is supported in a carrying position by the forward wheel assembly 14 and the rear wheel assembly 22, the frame or body 20 being separate from the forward wheel assembly and mounted on the rear wheel assembly for upward and rearward tilting movement to a dumping position, as seen in Figure 3.

A shaft 26 is rotatably journaled through the fifth wheel 16 and a similar rod or shaft 28 is disposed through the fifth wheel and positioned below the shaft 26 and parallel therewith. A pair of radius arms 30 and 32 are provided at one of their ends with transverse sleeves or collars 34 and 36, the latter being concentrically and rotatably disposed on the opposing ends of the shaft 28. In a similar manner, a pair of lifting arms 38 and 40 are formed with transverse sleeves 42 and 44 at one of their ends, the sleeves being rotatably and concentrically disposed on the shaft or rod 26. The radius arms 30 and 32 terminate at their opposing ends in similar transverse sleeves 48 and 50, the latter being swivelly and concentrically disposed on a transverse rod 52, which has its opposing ends fixed in the opposing parallel side beams 54 and 56 of the semi-trailer or carrying body.

A collar 58 is rotatably disposed on the central portion of the rod 52 and a pair of parallel lift levers 60 and 62 are formed integrally at one end therewith and project outwardly therefrom. A pair of juxtaposed complementary sheaves or pulleys 64 and 66 are rotatably journaled on a transverse shaft 68 disposed at the outer unattached ends of the levers.

The lift arms 38 and 40 are provided at their opposing ends with transversely disposed sleeves or collars 70 and 72, the latter being rotatably journaled on a transversely disposed connecting shaft 74, which is positioned transversely through the parallel lift levers 60 and 62. The shaft 74 is disposed transversely through the lift levers 60 and 62 centrally between the shaft 68 and the rod 52.

A substantially triangular supporting frame structure 76 is positioned between the opposing side beams 54 and 56 and depends therefrom, adjacent the rear end of the body 18. The supporting frame includes a pair of downwardly and inwardly complementary supporting bars 78 and 80, which have their upper ends secured to the parallel side beams. A pair of vertical supporting members 82 and 84 extend upwardly from the inner and lower ends of the bars 78 and 80. A pair of juxtaposed complementary sheaves or pulleys 86 and 88 are rotatably disposed on a pin or shaft 90, the latter being transversely disposed between the vertical supporting members 82 and 84. Thus, the sheaves or pulleys 86 and 88 are supported at the apex of the triangular supporting frame 76 in longitudinal alignment of the fifth wheel 16. A winch drum 92 is vertically journaled in the fifth wheel, between the parallel lift arms 38 and 40 and a block and tackle assembly 94 is actuated thereby, the same including the complementary pulleys 86 and 88 and the complementary pulleys or sheaves 64 and 66 and a cable 96 entrained thereover. The cable 96 is operatively carried by the winch drum 92 and extends around the pulley 88 and around the pulley 64 and is entrained back around the pulley 86 and around the sheave 66 and is secured as at 98 to the supporting frame 76.

In operation, as the cable 94 is wound upon the winch drum vertically mounted upon the fifth wheel of the hauling vehicle or tractor vehicle 12, the unattached extremities of the lifting levers 60 and 62 are rotated in a counterclockwise direction. As the lifting levers are revolved about the shaft or rod 52, the rear wheel assembly 22 is moved relative to the forward wheel assembly 14 and the forward end of the semi-trailer 24 is forced, through the linkage of the radius arms and lifting arms into a dumping position, as shown in Figure 3.

Having described the invention, what is claimed as new is:

1. A dump truck comprising a body including a rigid frame, forward and rear wheel assemblies normally supporting the body in carrying position, the body being separate from the forward wheel assembly and mounted on the rear wheel assembly for upward and rearward swinging movement to a dumping position, a shaft transversely disposed through the body, a pair of lifting levers rotatably journaled at one end on said shaft, longitudinally extending draft links pivotally connected at their rearward ends to the lift levers and pivoted at their forward ends on the forward wheel assembly, a pair of arms pivotally associated with the forward wheel assembly at their forward ends and rotatably disposed at their rear ends on the transverse rods, a winch drum rotatably supported on the forward wheel assembly and a block and tackle unit actuated by the winch drum and connected between the rear wheel assembly and the lift levers for swinging the lift levers in an arcuate path and shortening the wheel base of the dump truck, whereby the links and arms react to forward movement of the rear wheel assembly to raise the body.

2. A dump truck comprising a body including a rigid frame, forward and rear wheel assemblies normally supporting the body in carrying position, the body being detachably mounted on the forward wheel assembly and carried by the rear wheel assembly for upwardly and rearwardly swinging movement to a raised dumping position, a shaft transversely journaled through the body intermediate of the wheel assemblies, a pair of lifting levers rotatably journaled at one end to said shaft, longitudinally extending draft links pivotally connected at their forward ends to the lift levers and pivoted at their opposing ends on the forward wheel assembly, longitudinally extending arms pivotally disposed between the forward wheel assembly and the lift levers, a winch drum rotatably supported above the forward wheel assembly, a cable operatively carried by the drum and connected between the rear wheel assembly and the lift levers.

3. In combination, a tractor, a dumping body, a fifth wheel connecting the tractor and body, said body including a solid frame, a forward wheel assembly associated with said fifth wheel and normally supporting the forward end of the body, a rear wheel assembly supporting the rear end of the body, said body being adapted to be swung upwardly and rearwardly on the rear wheel assembly, a winch drum rotatably mounted on the fifth wheel, a cable operatively carried by the drum, guide means for said cable carried by the body adjacent the rear wheel assembly, a pair of lift levers pivotally carried by the body intermediate the wheel assemblies, said cable being operatively associated with the levers, longitudinally extending members pivotally disposed between the fifth wheel and lift levers and adapted upon shortening of the wheel base and swinging of the lift levers to tilt the body upwardly.

4. The combination of claim 3, wherein a sheave is rotatably carried by the free ends of the lift levers and the cable is entrained around the sheave and secured to the rear end of the body.

EDWIN A. SCHONROCK.

REFERENCES CITED

The following references are of record in the file of this patent:

UNITED STATES PATENTS

| Number | Name | Date |
| --- | --- | --- |
| 1,243,074 | Kellgren | Oct. 16, 1917 |
| 1,322,156 | Wright | Nov. 18, 1919 |
| 1,355,576 | Senderling | Oct. 12, 1920 |
| 1,443,890 | Wright | Jan. 30, 1923 |